Dec. 26, 1961   J. W. A. LABOUT   3,014,363
MICROELASTOMETER
Filed March 19, 1958   2 Sheets-Sheet 2

INVENTOR
J.W.A. LABOUT
BY *James Todorovic*
HIS ATTORNEY

United States Patent Office 3,014,363
Patented Dec. 26, 1961

3,014,363
MICROELASTOMETER
Johan Wilhelm Alphons Labout, Amsterdam, Netherlands, assignor to Shell Oil Company, a corporation of Delaware
Filed Mar. 19, 1958, Ser. No. 722,555
11 Claims. (Cl. 73—59)

This invention relates to a highly sensitive elastometer for measuring the elastic properties of asphalt-like materials and other thermoplastics at predetermined constant temperatures.

Various methods and instruments have been developed for determining the viscosity of asphalts and asphalt-like materials over long loading times. These instruments usually measure the sheer rate of asphalts by placing the asphalt between two surfaces and applying a steady load to one surface while maintaining the other surface fixed. Although instruments of this type, i.e., viscometers, are useful for testing the viscosity of asphalts over long loading periods, this information is only useful for determining the ability of the asphalt to support sustained loads, and gives very little, if any, information as to the ability of the asphalt to withstand shock loads. The ability of an asphalt to withstand shock loads is determined by its elastic property and this property cannot be measured by instruments which measure the shear of asphalt-like materials under sustained loads over long periods of time.

Accordingly, it is the principal object of this invention to provide a novel instrument for measuring the elastic properties of thermo-plastic materials over short loading times utilizing a balance beam vibrated at an audio frequency.

Another object of this invention is to provide a unique instrument which is capable of measuring the elastic properties of thermo-plastic materials while using very small quantities of the material to be tested.

Another object of this invention is to provide a novel instrument utilizing a balance beam for determining the elastic properties of thermo-plastic materials. The pivot shaft of the beam is disposed so as to oscillate in a bearing with a small quantity of the material being placed between the surfaces of the bearing and the beam pivot.

A further object of this invention is to provide a unique instrument for determining the elastic properties of thermo-plastic materials which utilizes a balance beam, one end of which is vibrated and the other end of which is provided with a means for determining the amplitude of the displacement. The phase difference between the induced vibrations and the actual vibrations of the balanced measured at the free end is then used to give an indication of the elastic properties of the material.

This invention provides an instrument which is capable of measuring the elastic property of asphalt-like materials over relatively short loading times. The instrument utilizes a balance beam vibrated at an audio-frequency with one of the pivots of the beam being mounted in a cup shaped member with a small quantity of the material to be tested placed in the cup. When the beam is vibrated the asphalt will tend to dampen the vibrations of the beam so that if one vibrates one end of the beam and measures the amplitude of the displacement at the other end of the beam and compares the phase of the induced vibration (driving force) and the actual vibration (displacement) of the balance beam, it will give an indication of the elastic property of the asphalt. Of course, other factors such as the moment of inertia of the beam and instrument errors enter into the comparison but these errors can all be compensated for and a true indication of the elastic property of the asphalt over a short loading time obtained.

These and other objects and advantages of this invention will be more easily understood from the following detailed description of a preferred embodiment when taken in conjunction with the attached drawings in which.

Figure 1:
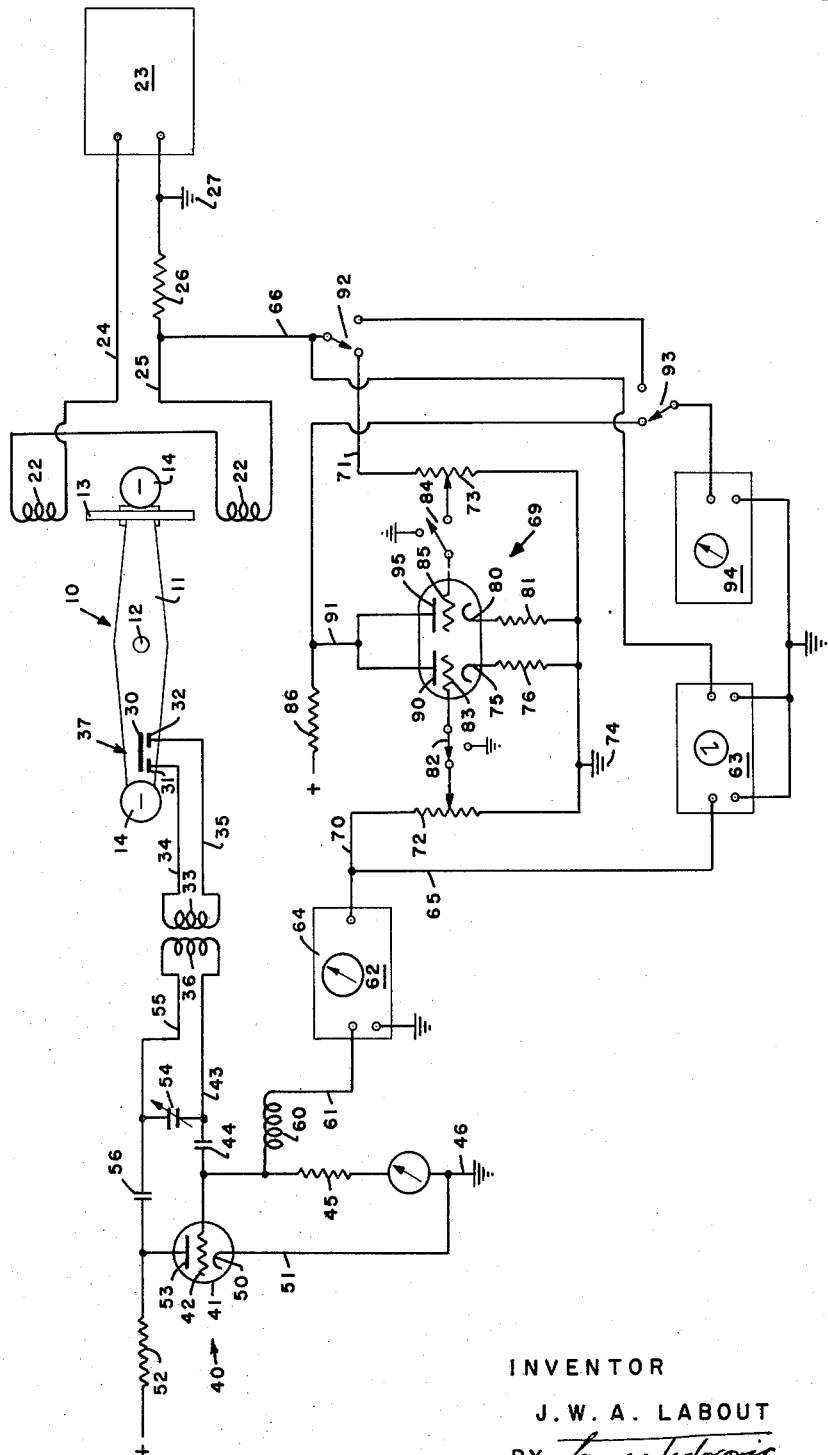
FIG. 1 is a schematic drawing of the invention showing the means used for vibrating the balance at one end of the beam, the means used for detecting the displacement of the balance, which in the preferred embodiment of the apparatus is disposed at the other end of the beam and the phase comparing means.

Referring to FIG. 1 there is shown a balance means 10 which is vibrated by means of two transducers 22 disposed at its right end. The amplitude of the displacement of the beam is detected by suitable means situated at its left end and fed into a high frequency oscillator 40. The output of the oscillator is amplified and couplied to one-half of a dual triode tube 69 which serves as the phase comparer. The other half of the dual triode tube 69 is coupled to the audio frequency oscillator used for supplying the power to the transducers. Thus, the difference in phase relationship between the vibrations of the electrical current of the transducers and the mechanical vibrations of the beam (transformed by means of oscillator 40 into corresponding electrical vibrations) will appear as an output signal and can be used for determining the elasticity of the asphalt sample.

Figure 2:
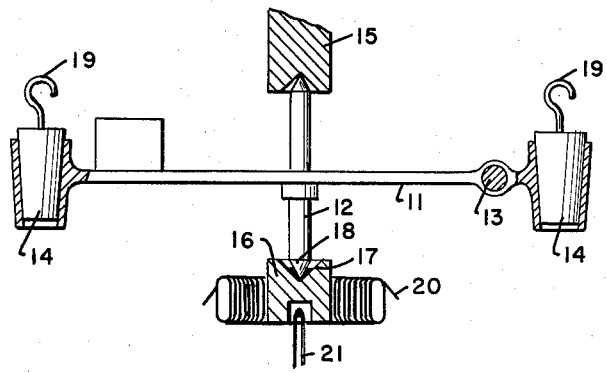
FIG. 2 is a side view of the balance beam shown in FIG. 1 and drawn to an enlarged scale and showing the cup in which the test sample is loaded.

The balance beam 10 consists of a beam member 11 which has a suitable spindle or pivot shaft 12 mounted at its center of gravity. The spindle 12 is supported at its upper end by a bearing 15 and at its lower end by a cup shaped bearing 16 as shown in FIG. 2. The cup shaped bearing 16 is provided with a conical shaped recess 17 whose included angle is greater than the included angle of the cone shaped end 18 of the spindle 12. The cup shaped bearing 16 in addition to forming a bearing for the spindle 12 forms a thrust absorbing bearing for the spindle. The sample of material to be tested is placed in the cup shaped bearing 16 and occupies the clearance between the recess 17 and the end 18 of the spindle 12. The cup shaped bearing 16 is also provided with a suitable electric heating means 20 and a thermocouple 21 so that the test sample may be liquefied temporarily at any desired temperature. The temperature at which the measurement is to be carried out is preferably maintained at a desired level by housing the instrument in a constant temperature chamber or the like (not shown in the drawing). Cup shaped members 14 mounted on both ends of the beam are provided for receiving removable weights 19 so that the moment of inertia of the beam member 11 may be changed in order that two different values for the moment of inertia may be used to determine the elasticity of a test sample as will be more fully explained below.

Two transducers 22 shown as inductance coils are mounted adjacent the opposite ends of a permanent magnet 13 which is secured to the right hand end of the beam for inducing a vibratory motion into the balance beam 10. The transducers 22 are connected in series with each other and to an audio frequency oscillator 23 by means of leads 24 and 25. The oscillator 23 preferably has a variable output with a range of the order of 3 to 15,000 cycles per second. A resistance element 26 is disposed in the lead 25 which in addition to being connected to the oscillator 23 is also connected to a ground 27. Fixed to the end of the beam opposite the permanent magnet 13 is one plate 30 of a capacitor 37 used for detecting the amplitude of the vibratory motion of the beam. Mounted adjacent the capacitor plate 30 are two additional plates 31 and 32 which together form the other plate of the capacitor 37. The capacitor plate 31 is connected to one end of an inductance coil 33 by means of a lead 34 while the capacitor plate 32 is connected to the other end of the inductance coil by means of a lead 35. The capacitor 37 and the inductance coil 33 thus form an L.C.-circuit whose natural frequency will vary in accordance with the value of the capacity of 37 and thus with the amplitude of the vibration of the balance beam 10.

The L.C.-circuit is inductively coupled by means of an inductance 36 to the grid 42 of a triode 41 which forms a high frequency oscillator 40. The frequency of the high frequency oscillator should be adjusted by means of the variable capacitor 54 until it matches the frequency of the L.C.-circuit described above. In fact the frequency of the oscillator and the natural frequency of the L.C.-circuit differ a slight amount, thus that variations in the natural frequency cause variations in the grid current of the triode 41, which bear a linear or practically linear relationship to each other. One end of the inductance 36 is connected to plate 53 of triode 41 by means of a lead 55 through a capacitor 56. The opposite end of the inductance 36 is connected to the grid 42 by means of a lead 43 having a coupling capacitor 44 disposed therein. The grid 42 is also connected to ground through a coupling resistance 45 by means of a lead 46. The plate 53 of the triode 41 is also connected to a power supply via a resistance 52 while the cathode 50 is connected to ground by means of a lead 51.

The L.C.-circuit 33–37 influences the grid current of the high frequency oscillator in such a way that the variation in the natural frequency of this circuit, caused by the vibration of the balance beam 10, effects a corresponding change in the grid current of the oscillator and thus gives rise to a corresponding alternating voltage across resistance 45 which is proportional to the displacement of the beam. In this way the displacement of the balance beam is transformed into a sinusoidal alternating voltage whose frequency is equal to the vibrational frequency of the beam, its voltage being proportional to the beam displacement.

The alternating voltage which arises across the resistance 45 is coupled to an amplifier 62 by means of a lead 61 which has an inductance 60 disposed therein. The output of the amplifier 62 is connected to both the grid 83 of the dual triode 69 by means of a lead 70 and an oscilloscope 63 by means of a lead 65. The amplifier 62 is also supplied with a voltmeter 64 so that the amplitude of the alternating voltage arising across the resistance 45 may be determined. The output of the audio frequency oscillator 23 is also coupled to the oscilloscope 63 by means of a lead 66 in order that the phase difference between the induced electrical vibration and the actual vibration of the balance beam 10 may be made visible.

This phase difference or phase angle is measured by means of the dual triode tube 69. The output of the amplifier 62 as explained above is connected to one grid 83 for the tube 69 through a resistance 72, one end of which is connected to a ground 74. The output of the audio frequency oscillator 23 is connected to the other grid 85 of the tube 69 by means of a lead 71 and a resistor 73, one end of which is also connected to the ground 74. By adjusting the values of resistance 72 and 73 the amplitudes of the two alternating voltages supplied to the two grids of tube 69 may be adjusted to the same value. A voltmeter 94 is provided for reading these voltages by adjusting the switches 92, 93 to the proper positions. The cathodes 75 and 80 of the tube 69 are connected to ground through resistances 76 and 81, respectively, while the plates 90 and 95 are connected to a suitable B+ power supply through a resistance 86 by a lead 91. Switches 82 and 84 are disposed in the leads connecting the resistances 72 and 73 to the grids 83 and 85 in order that the voltages supplied to the two grids may be adjusted separately to the same value and read on the voltmeter 94.

After closing the switches 82 and 84 the dual triode tube summates in its plate circuit the two alternating voltages mentioned above to an ouput voltage, which can be read on voltmeter 94, and which is a measure of the phase difference in question. This can be seen from the fact that if the separate input voltages from the audio oscillator 23 and the high frequency oscillator 40 are adjusted to the same value the output voltage will be represented by the equation:

$$V = (V_0 + V_1) \cos \tfrac{1}{2} \phi$$

where $V_0$ is equal to the voltage from the oscillator 40, $V_1$ is equal to the voltage from the oscillator 23 and $\phi$ is equal to the phase difference between the two voltages. From this relationship the phase difference $\phi$ can be calculated.

When the above described instrument is operated a small quantity of the material to be tested, of the order of 10–20 cubic mm., is weighed in the cup member 16, heated and liquefied by the electric heating means 20 to secure complete adhesion between the sample and the cup and spindle, and then brought to and maintained at the temperature at which the measurement will be carried out. The audio frequency oscillator 23 is then energized in order that the inductance coils 22 may vibrate the balance beam 10. The amplitude and phase of the resulting mechanical vibration of the beam is inter alia dependent on the elastic properties of the test sample disposed in the cup member 16. Thus, the vibration of the beam will be out of phase with the induced electrical vibration and vary in amplitude depending on the elastic property of the sample. The amplitude and the phase of the vibration of the beam is detected by means of the capacitor inductance circuit 33, 37, which is inductively coupled to the high frequency oscillator 40 whose output is amplified and supplied to both the oscilloscope 63 and the dual triode 69. The output of the audio frequency oscillator 23 which is used to energize the two inductance coils 22 is also supplied to the oscilloscope 63 and dual triode 69. Thus, the phase difference between the vibrations in question may be easily read from the oscilloscope. In addition to this visual presentation the phase difference is determined by the dual triode 69 whose output voltage can be read on the voltmeter 94 and is proportional to the cosine of half the phase angle.

Knowing the amplitude $a$ of the vibration, the phase difference $\phi$ and the moment of inertia J of the balance beam 10 one may easily calculate the elastic property of the sample. By definition the dynamic stiffness of the sample $S_\omega$ (for a certain value of $\omega$) which is equal to the elastic property of the sample for short load times is:

$$S_\omega = \frac{K.M_b}{a}$$

where K is a proportionality constant, $M_b$ is the actual moment exerted on the sample and $\omega$ is the angular velocity of the vibration. Since $M_b$ cannot be calculated directly it is related to the external moment M by:

$$M_b = M - J\omega^2$$

Figure 3:
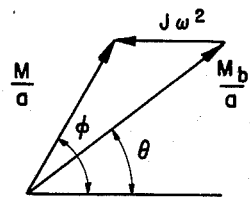
FIG. 3 is a vector diagram for one moment of inertia of the beam.
Figure 4:
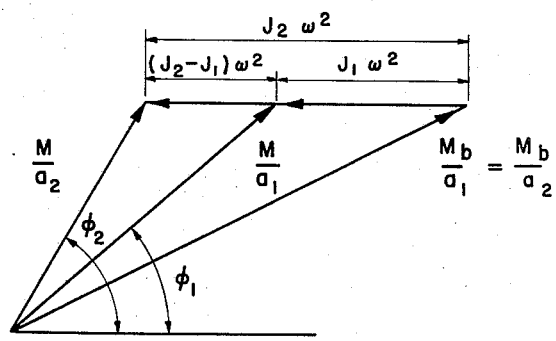
FIG. 4 is a vector diagram for two different moments of inertia of the same beam.

In case of harmonic oscillations at an angular velocity $\omega$, $M_b = M_0 \sin \omega t$ and the impedance diagram shown in FIG. 3 applies. Since it is impossible to measure $M_0$ one must obtain a second measurement at the same $\omega$ but using a different moment of inertia for the balance beam 10. This can be done as explained above by adding equal weights 19 of known value to each of the cup members 14 described above. If the external moment M is maintained constant by adjusting the current supplied to the inductance coils 22 to the same value the impedance diagram will change to that shown in FIG. 4. From FIG. 4 one obtains $$\frac{M}{a_1} = \frac{(J_2 - J_1)\omega^2 \sin \phi_2}{\sin(\phi_2 - \phi_1)}$$

with this value of $M/a_1$ and known values of $J_1$ and $J_2$, $\omega^2$ and $\phi_1$ and $\phi_2$ this leads directly to $M_b/a$. To permit rapid calculation of $M/a_1$ use can be made of the fact that at a constant current to the transducers 22 the voltage across the resistance 45 is proportional to the amplitude $a$ for different value of $\omega$ so that:

$$\frac{M}{a_1} = \frac{B}{A_1}$$

where B is a proportionality constant and $A_1$ is the voltage measured at 64. From the above equations the value of B can be calculated.

It will be appreciated by those skilled in the art of instruments that various of the above factors may be obtained directly by using suitably calibrated indicators. Accordingly, this invention should not be limited to the details described above but only to its broad spirit and scope.

I claim as my invention:

1. A device for measuring the elastic properties of thermo-plastic materials comprising: a pivoted shaft having a balanced beam member disposed at an angle to the axis of said shaft; said shaft having a cone shaped end, said cone shaped end being disposed in a cone shaped bearing cup with the material to be tested being disposed between the surfaces of the cup and the shaft; transducer means disposed to impart a vibrating motion to said beam member about said axis; a capacitor means disposed on said beam member, said capacitor means being coupled to an inductive means; circuit means coupled to the capacitor and inductor means for deriving an output signal representing the displacement of said beam and comparing means coupled to said transducer means and said circuit means for comparing the phase of the output of said circuit means with the phase of said transducer means.

2. A device for determining the elastic properties of thermo-plastic materials comprising: a balanced beam with a pivoted shaft disposed at an angle to said beam; thrust absorbing means for supporting one end of said shaft; said thrust absorbing means consisting of a cone shaped end on said shaft and a cup shaped bearing member having a cone shaped recess, the included angle of the cone on said shaft being less than the included angle of said cone shaped recess to provide a space in which a small quantity of the material to be tested may be disposed; vibrating means for vibrating said beam disposed at one end of the beam to vibrate said beam about the axis of said shaft and indicating means for detecting the displacement of said beam disposed at the other end of the beam and comparing means coupled to both said vibrating means and said indicating means for comparing the phase of said displacement with the phase of said vibrating means.

3. A device for determining the elastic properties of thermo-plastic materials comprising: a balanced beam with a pivoted shaft disposed at an angle to said beam; thrust absorbing means for supporting one end of said shaft; said thrust absorbing means consisting of a cone shaped end on said shaft and a cup shaped bearing member having a cone shaped recess, the included angle of the cone on said shaft being less than the included angle of said cone shaped recess to provide a space in which a small quantity of the material to be tested may be disposed; transducer means driven by an audio frequency oscillator for vibrating said beam about the axis of said shaft; displacement detecting means disposed to detect the displacement of said beam and comparing means coupled to said audio frequency oscillator and said displacement detecting means for comparing the phase of the output of said audio frequency oscillator with the phase of the output of said displacement detecting means.

4. A device for measuring the elastic properties of thermo-plastic materials comprising: a rotatable member, a fixed member for supporting said rotatable member; said fixed member and said rotatable member being disposed with at least one surface on each in juxtaposition with one surface on the other, said fixed and rotatable member being adapted for disposing a small amount of the material between said juxtaposed surfaces; a beam member fixed at the center of gravity thereof to the rotatable member at an angle to the axis of rotation; means for vibrating said beam about the axis of the rotatable member and indicating means disposed to detect the vibrations of said beam and means coupled to said vibrating and indicating means to indicate the phase difference between the vibration of the beam and the vibration of the vibrating means.

5. A device for measuring the elastic properties of thermo-plastic materials comprising: a beam having a shaft disposed at the center of gravity of said beam and at an angle to said beam; support means for said shaft including a thrust absorbing member; said shaft and said thrust absorbing member having juxtaposed surfaces with a small quantity of the material to be tested being disposed between said juxtaposed surfaces; a magnetic member secured to one end of said beam; coil means disposed in inductive relationship to said magnetic means; an audio frequency oscillator coupled to excite said coil means to vibrate said beam about the axis of said shaft; detecting means mounted on the other end of said beam for determining the displacement of said beam and comparing means coupled to said audio frequency oscillator and said detecting means for determining the phase difference between the output of said audio frequency oscillator and the displacement of said beam.

6. A device for measuring the elastic properties of thermo-plastic materials comprising: a beam having a shaft disposed at the center of gravity of said beam and at an angle to said beam; support means for said shaft including a thrust absorbing member; said shaft and said thrust absorbing member having juxtaposed surfaces with a small quantity of the material to be tested being disposed between said juxtaposed surfaces; members disposed on said beam for receiving removable weights to change the moment of inertia of said beam; a magnetic member secured to one end of said beam; coil means disposed in inductive relationship to said magnetic means; an audio frequency oscillator coupled to excite said coil means to vibrate said beam about the axis of said shaft; detecting means mounted on the other end of said beam for determining the displacement of said beam and comparing means coupled to said audio frequency oscillator and said detecting means for determining the phase difference between the output of said audio frequency oscillator and the displacement of said beam.

7. A device for measuring the elastic properties of a thermo-plastic material comprising: a balanced beam having a pivoted shaft disposed at an angle to said beam; support means disposed to rotatably support said shaft with a small quantity of the material to be tested being disposed between said support means and said shaft; members disposed on said beam for receiving removable weights to change the moment of inertia of said beam; vibrating means positioned to vibrate said beam about the axis of said shaft; detecting means disposed to detect the displacement of said beam and comparing means coupled to said vibrating means and said detecting means for determining the phase difference between the phase of the displacement of said beam and the phase of said vibrating means.

8. A device for measuring the elastic properties of thermoplastic materials comprising: a rotatable member, a fixed member for supporting said rotatable member; said fixed member and said rotatable member disposed with at least one surface on each in juxtaposition with one surface on the other, said fixed and rotatable member being adapted for disposing a small amount of the material between said juxtaposed surfaces; a balanced beam member fixed to the rotatable member at as angle to the axis of rotation; drive means disposed adjacent one end of the beam to oscillate said beam about the axis of the rotating member; a pick-up means disposed adjacent the other end of said beam to develop a signal proportional to the displacement of said other end of the beam and means coupled to said drive means and said pick up means for comparing the phase of said signal with the phase of the input to said drive means.

9. A device for measuring the elastic properties of thermoplastic materials comprising: a rotatable member, a fixed member for supporting said rotatable member; said fixed member and said rotatable member disposed with at least one surface on each in juxtaposition with one surface on the other, said fixed and rotatable member being adapted for disposing a small amount of the material between said juxtaposed surfaces; a balance beam member fixed to the rotatable member at an angle to the axis of rotation; electric drive means responsive to an alternating signal and disposed to induce an oscillation in the beam about the axis of the rotatable member; a pick-up means disposed to develop an output signal proportional to the displacement of said beam and phase comparing means coupled to said drive means and said pick up means for comparing the phase of said alternating and said output signals.

10. A device for measuring the elastic properties of thermoplastic materials comprising: a rotatable member, a fixed member for supporting said rotatable member; said fixed member and said rotatable member disposed with at least one surface on each in juxtaposition with one surface on the other, said fixed and rotatable member being adapted for disposing a small amount of the material between said juxtaposed surfaces; a balanced beam member fixed to the rotatable member at an angle to the axis of rotation; electric drive means responsive to an alternating signal and disposed to induce an oscillation in the beam about the axis of the rotating member; one plate of a capacitor fixed to said beam, the other plate being disposed in a fixed position adjacent said one plate; said capacitor being coupled to an inductance, said capacitor and inductance being coupled to a vacuum tube oscillator to influence the current flow in the grid resistor of said oscillator and means coupled to said drive means and said oscillator for comparing the phase of the voltage signal appearing across said grid resistor with the phase of said alternating signal.

11. A device for determining the elastic properties of thermo-plastic materials comprising: a balanced beam having a pivot shaft disposed at an angle to the axis of said beam; thrust absorbing means disposed to support one end of said shaft; said thrust absorbing means being adapted to contain a small quantity of the material to be tested between the juxtaposed surfaces of said thrust means and said one end of said shaft; vibrating means disposed adjacent one end of said beam for vibrating said beam about said axis of said shaft; indicating means disposed adjacent said beam and spaced from said pivot shaft for detecting the displacement of said beam and comparing means coupled to both said vibrating means and said indicating means for comparing the phase of said displacement with the phase of said vibrating means.

References Cited in the file of this patent

UNITED STATES PATENTS

| | | |
|---|---|---|
| 2,142,854 | La Pierre | Jan. 3, 1939 |
| 2,143,074 | Killman et al. | Jan. 10, 1939 |
| 2,254,476 | Esbaugh et al. | Sept. 2, 1941 |
| 2,774,239 | Fitzgerald | Dec. 18, 1956 |

FOREIGN PATENTS

| | | |
|---|---|---|
| 896,570 | Germany | Nov. 12, 1953 |